June 3, 1941.  N. J. KOOK ET AL  2,244,069

SAND SPREADER FOR VEHICLES

Filed March 24, 1939  2 Sheets-Sheet 1

Inventors
Nicholas J. Kook,
Beatrice F. Kook,

Attorneys

June 3, 1941.  N. J. KOOK ET AL  2,244,069
SAND SPREADER FOR VEHICLES
Filed March 24, 1939  2 Sheets-Sheet 2
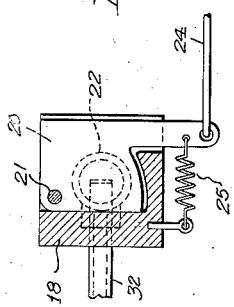
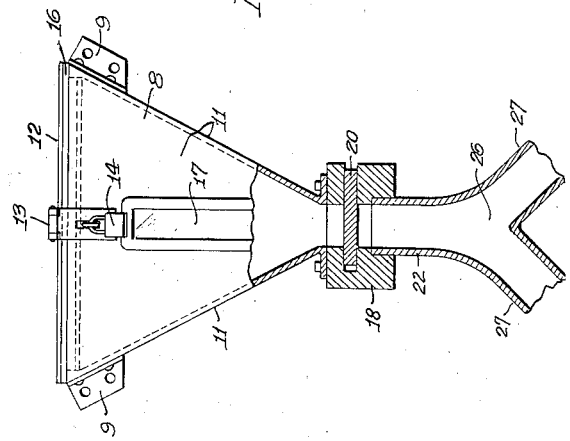
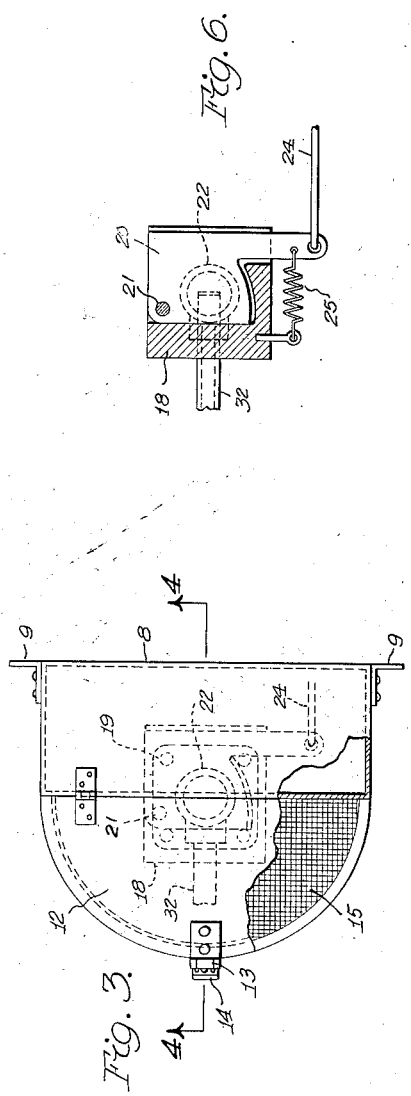
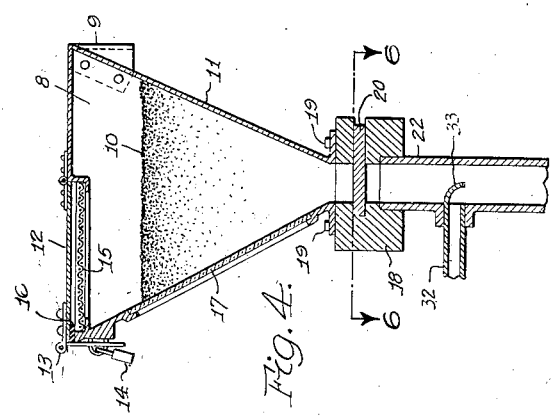
Inventors
Nicholas J. Kook,
Beatrice F. Kook,
Attorneys Patented June 3, 1941

2,244,069

UNITED STATES PATENT OFFICE 2,244,069

SAND SPREADER FOR VEHICLES

Nicholas J. Kook and Beatrice F. Kook, Detroit, Mich.

Application March 24, 1939, Serial No. 263,836

1 Claim. (Cl. 291—35)

This invention relates to new and useful improvements in sand spreaders for vehicles whereby sand or some other gritty substance is spread in front of the wheels of a vehicle to prevent it from skidding on icy pavements and improve the traction.

An object of this invention is to provide a receptacle for storing sand and means for conveying the sand rapidly to the pavement near the wheels of a vehicle at the will of the operator.

Another object of the invention is to keep the sand warm both while being stored and while being conveyed to the pavement in order that it will flow freely and to prevent it from becoming frozen when wet.

A further object of the invention is to spread the sand in a wide path in front of the wheels so that when the vehicle is turning or if it is skidding sideways the wheels will come in contact with the sand.

Another object of the invention is to use part of the exhaust gases of an internal combustion engine to keep the sand warm and also to act as a blowing means to convey the sand to the pavement.

A further object of the invention is to provide a valve which will release a portion of the sand from the storing receptacle rapidly and at the same time open the exhaust to assist the flow of the sand.

Another object of the invention is to provide a receptacle with a screen for the sand and which will at the same time protect the sand from surreptitious removal.

It is also an object of this invention to provide means for retaining sand within the receptacle, prevent moisture from gaining access thereto, and prevent exhaust gases from leaking therefrom.

Other objects and advantages will become hereinafter more fully apparent by reference to the accompanying drawings wherein the invention is illustrated by way of example in which—

Fig. 3 is a plan view of the receptacle for storing the sand, the same being partially in section;

Fig. 4 is a side elevation of the same, being in section taken along the line 4—4 of Fig. 3;

Fig. 5 is a front elevation of the receptacle being partially cut away to show the valve installation;

Fig. 6 is a sectional view taken along the line 6—6 of Fig. 4 showing the valve installation.

Figures 1, 2:
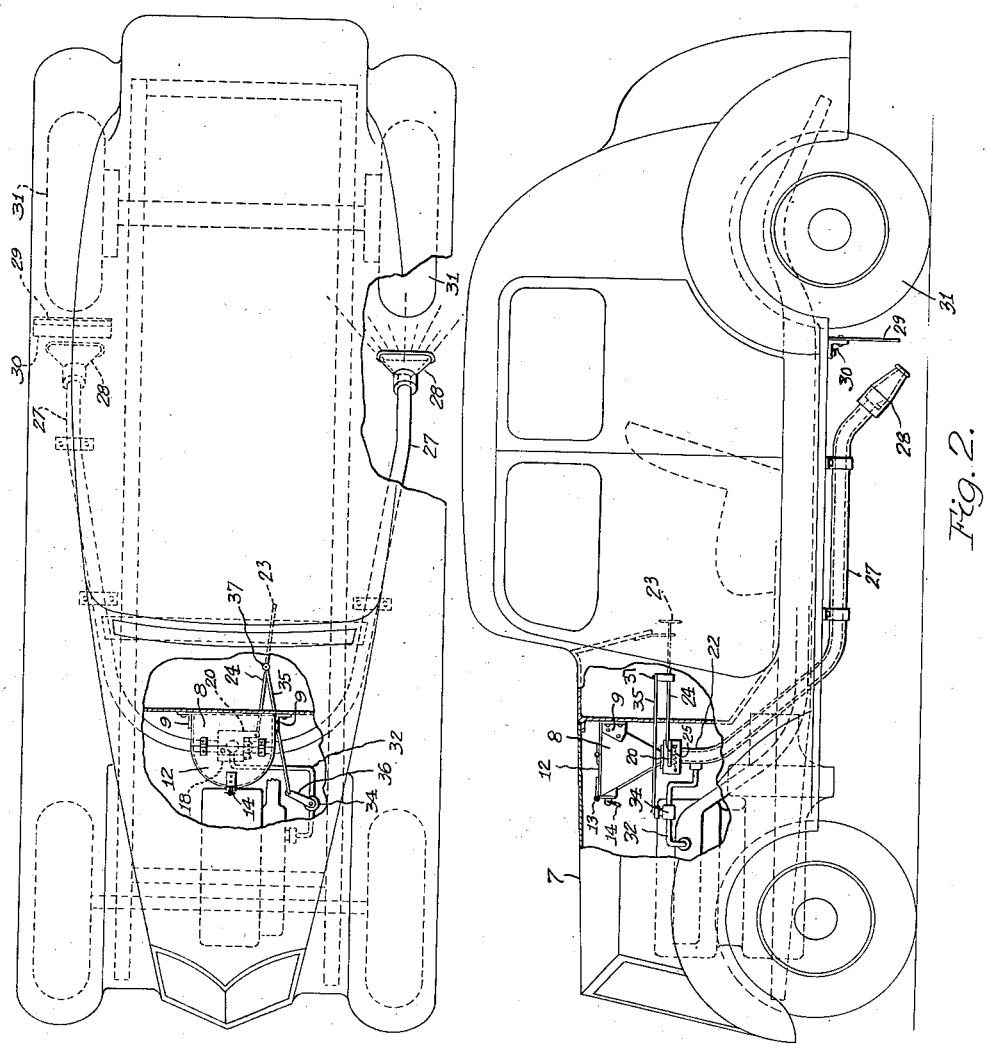
Figure 1 is a diagrammatic illustration of an automobile having the invention installed thereon, this view being a plan view.
Fig. 2 is a side elevation of the same.

More particularly, the reference numeral 7 indicates an automobile upon which the device is installed, it being understood that this device can be used with any type of vehicle including buses, trains and streetcars, airplanes, etc. A receptacle 8 is attached to a convenient part of the automobile by means of brackets 9, but preferably the receptacle is installed directly under the hood in front of the dash and over the engine so that the heat thereof will keep the sand 10 in the receptacle warm and prevent frozen lumps from being formed therein when the sand is damp. The receptacle 8 has slanting sides 11 so that the sand will flow out freely when desired. It also has a hinged cover 12 provided with a hasp 13 and a lock 14 to prevent tampering with the contents of the receptacle. A screen 15 under the cover 12 prevents large lumps from passing into the receptacle and as this screen may be firmly attached to the receptacle it also prevents tampering with the contents of the receptacle when the lock 14 is not used. A gasket 16 between the cover and the receptacle prevents sand from leaking out at the top. This gasket also prevents moisture from entering the receptacle, and exhaust gases (which are introduced into the system) from leaking therefrom. The receptacle may also be provided with a sight glass 17 so that the quantity of sand may be readily ascertainable.

The receptacle 8 is connected at its lower extremity to a valve 18 by means of bolts 19. The valve consists of a plate 20 pivoted about a pin 21 so that when in closed position there is no communication between the receptacle 8 and the pipe 22, but when the operator of the vehicle pulls the handle 23 which is attached to the rod 24, the plate 20 turns about the pin 21 and uncovers the pipe 22, allowing sand to escape from the receptacle. A spring 25 returns the plate to closed position when the handle 23 is released.

The pipe 22 branches into a Y 26, to each branch of which are attached pipes 27, each of which leading to a position adjacent one of the rear wheels of the vehicle. The shape of the pipes 27 must conform to the understructure of the automobile, but in general a continuously downward sweeping curve is desirable so that the sand released from the valve 18 will flow rapidly through the pipes by gravity. The lower extremities of the pipes 27 are provided with nozzles 28 which cause the sand to be spread out in a path which is broader than the width of the tires of the vehicle, this result being accomplished by the flaring configuration of the nozzles. Deflectors 29 are attached to the frame of the automobile by means of brackets 30 between the nozzles 28 and the wheels 31 so that the sand will be deflected downward to the pavement ahead of the wheels and splash of the wheel is avoided when slushy or raining.

Exhaust gases from the manifold of the engine may be conveyed by means of a tube 32 to the pipe 22 and deflected downward by means of the baffle 33. In the tube 32 there is provided a valve 34 which is operated by means of a lever 36 and a rod 35, which is pivotally connected to the rod 24 at 37. Hence, when the handle 23 is operated exhaust gases will flow into the pipe 22 when sand is passing therethrough. The exhaust gases tend to blow the sand and also to warm it and the pipes 27 so that the sand does not freeze.

Therefore, when the operator actuates the handle 23, the valves 18 and 34 are opened causing sand and exhaust gases simultaneously to pass through the piping 27, causing the sand to be deposited in front of the wheels of the vehicle so as to provide a firm traction for the wheels and prevent skidding.

Where the vehicle is provided with air brakes for example, the air may be used as the blowing means instead of using the exhaust gases from the manifold.

Having thus fully described our invention, what we claim is:

A sand spreader for a vehicle comprising, a hopper extending over the engine of the vehicle, said hopper having downwardly converging sides, a sand valve adjacent the lower end of said hopper to control the emission of sand from said hopper, said valve consisting of a housing, a concavity within said housing, a hole through said housing with its axis transverse to the plane of said concavity and a plate fitting within said concavity pivoted about a point in such manner as to control the flow of sand through said hole, a conduit extending from said sand valve and terminating in advance of the wheels of the vehicle, a pipe for conveying exhaust gases from the engine of the vehicle into said conduit and terminating in said conduit in close proximity to said sand valve, an exhaust valve controlling the flow of exhaust gases through said pipe, control means for actuating said sand valve and said exhaust valve connected to said exhaust valve and to said plate of said sand valve at a point diametrically opposite the point about which said plate is pivoted in relation to said hole, a nozzle at the lower extremity of said conduit, and a deflector attached to the vehicle adapted to direct the sand downward toward the roadway in a wide swath.

NICHOLAS J. KOOK.
BEATRICE F. KOOK.